(12) United States Patent
Pavuk

(10) Patent No.: US 11,396,212 B1
(45) Date of Patent: Jul. 26, 2022

(54) VEHICLE HAVING AN AXLE ASSEMBLY AND A WHEEL END SUPPORT HOUSING

(71) Applicant: ArvinMeritor Technology, LLC, Troy, MI (US)

(72) Inventor: Gregory D. Pavuk, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/331,903

(22) Filed: May 27, 2021

(51) Int. Cl.
*B60G 3/24* (2006.01)
*B60G 21/055* (2006.01)

(52) U.S. Cl.
CPC ............. *B60G 3/24* (2013.01); *B60G 21/055* (2013.01); *B60G 2200/422* (2013.01); *B60G 2204/143* (2013.01); *B60G 2300/026* (2013.01)

(58) Field of Classification Search
CPC .. B60G 3/24; B60G 21/055; B60G 2200/422; B60G 2204/143; B60G 2300/0262; B60K 17/16; B60K 17/306; B60K 17/165
See application file for complete search history.

(56) References Cited

U.S. PATENT DOCUMENTS

| | | | | |
|---|---|---|---|---|
| 1,245,715 A * | 11/1917 | Hartline | ............... | B60K 17/306 |
| | | | | 180/262 |
| 1,962,937 A * | 6/1934 | Richman | ................... | B60K 5/12 |
| | | | | 180/58 |
| 3,420,327 A * | 1/1969 | Nallinger | ............. | B60K 17/306 |
| | | | | 180/375 |
| 4,258,818 A * | 3/1981 | Uzu | ...................... | B60K 17/043 |
| | | | | 180/257 |
| 4,418,783 A * | 12/1983 | Teraoka | ................ | B60K 17/303 |
| | | | | 180/209 |
| 5,637,048 A * | 6/1997 | Maeda | .................... | H02K 7/116 |
| | | | | 475/150 |
| 7,111,862 B1 | 9/2006 | Eng | | |
| 8,464,611 B1 * | 6/2013 | Chandler | ............. | B60K 17/165 |
| | | | | 74/607 |
| 8,857,554 B1 * | 10/2014 | Keller | .................. | B60K 17/358 |
| | | | | 180/262 |

FOREIGN PATENT DOCUMENTS

| | | | | |
|---|---|---|---|---|
| GB | 2017022 A | * | 10/1979 | ........... B60K 17/043 |
| JP | 2004359015 A | * | 12/2004 | ........... B60K 17/303 |
| WO | WO-2008113484 A1 | * | 9/2008 | ........... B60K 17/348 |

* cited by examiner

*Primary Examiner* — Paul N Dickson
*Assistant Examiner* — Matthew D Lee
(74) *Attorney, Agent, or Firm* — Brooks Kushman PC

(57) ABSTRACT

A vehicle having an axle assembly and a wheel end support housing. The axle assembly may have a differential assembly. The wheel end support housing may be mounted to a frame rail and may be spaced apart from the axle assembly. A linkage may operatively connect the differential assembly to a wheel end assembly may be mounted to the wheel end support housing.

20 Claims, 4 Drawing Sheets

VEHICLE HAVING AN AXLE ASSEMBLY AND A WHEEL END SUPPORT HOUSING

TECHNICAL FIELD

This disclosure relates to a vehicle that may have an axle assembly and one or more wheel end support housings that may be separate from the axle assembly.

BACKGROUND

A terminal tractor having a rear axle is disclosed in U.S. Pat. No. 7,111,862.

SUMMARY

In at least one embodiment, a vehicle is provided. The vehicle may include a chassis, an axle assembly, a wheel end support housing, a wheel end assembly, and a linkage. The chassis may include first and second frame rails. The axle assembly may be mounted to the chassis and may include a differential assembly that is rotatable about a differential axis. The wheel end support housing may be mounted to the first frame rail and may be spaced apart from the axle assembly. The wheel end assembly may be mounted to the wheel end support housing. The wheel end assembly may have a hub that may be rotatable about a wheel axis that may differ from the differential axis. The linkage may be received in the wheel end support housing and may operatively connect the differential assembly to the hub.

In at least one embodiment, a vehicle is provided. The vehicle may include a chassis, an axle assembly, a wheel end support housing, a wheel end assembly, and a linkage. The chassis may include first and second frame rails. The axle assembly may be mounted to the chassis and may include a differential assembly that is rotatable about a differential axis. The wheel end support housing may be mounted to the frame rail and may be spaced apart from the axle assembly. The wheel end assembly may be mounted to the wheel end support housing and may have a hub that may be rotatable about a wheel axis. The differential axis may be longitudinally positioned closer to a rear of the vehicle than the wheel axis. The differential axis may be disposed below the wheel axis. The linkage may be received in the wheel end support housing and may operatively connect the differential assembly to the hub.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
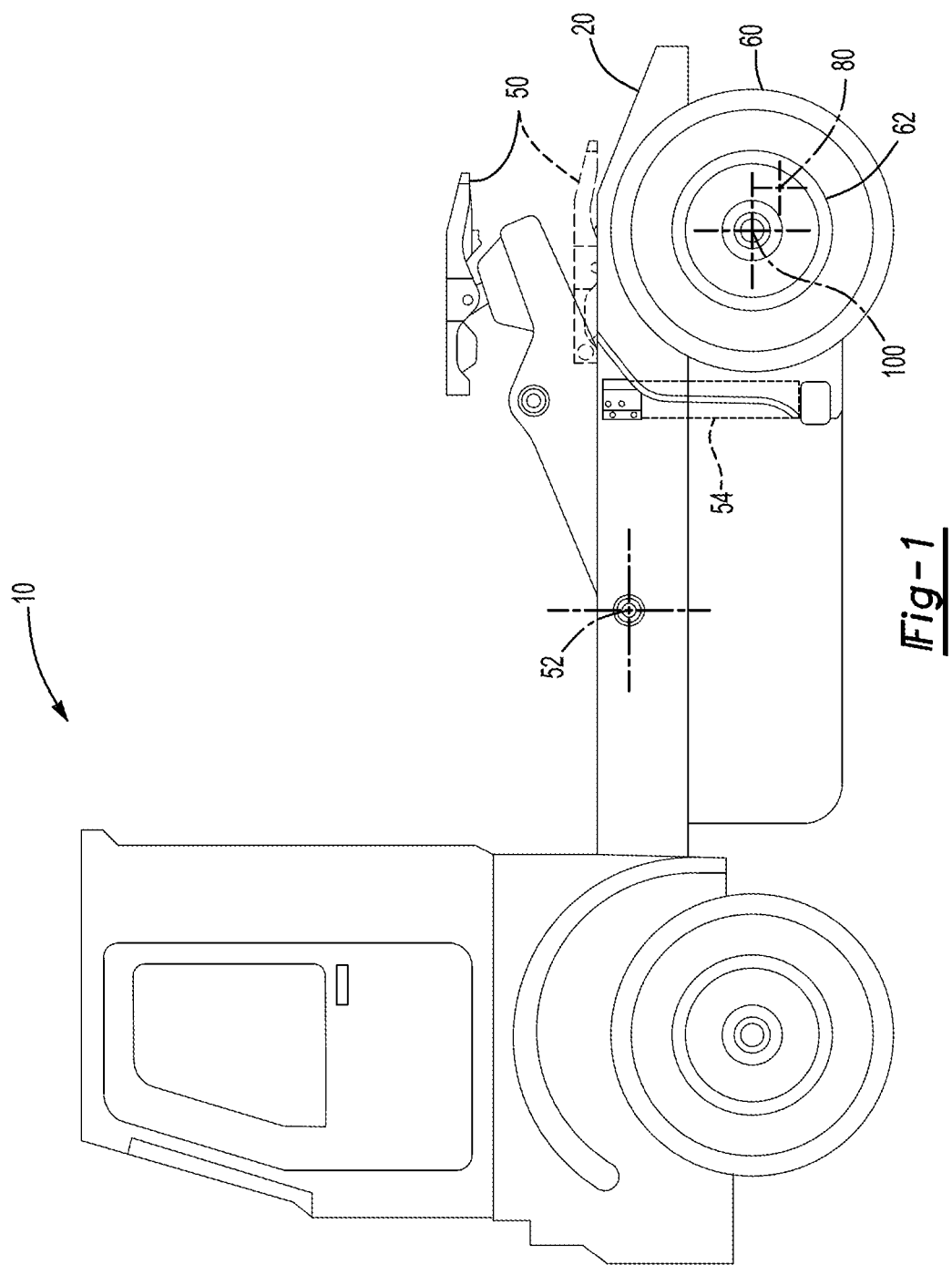
FIG. 1 is a side view of an example of a vehicle.
Figure 2:
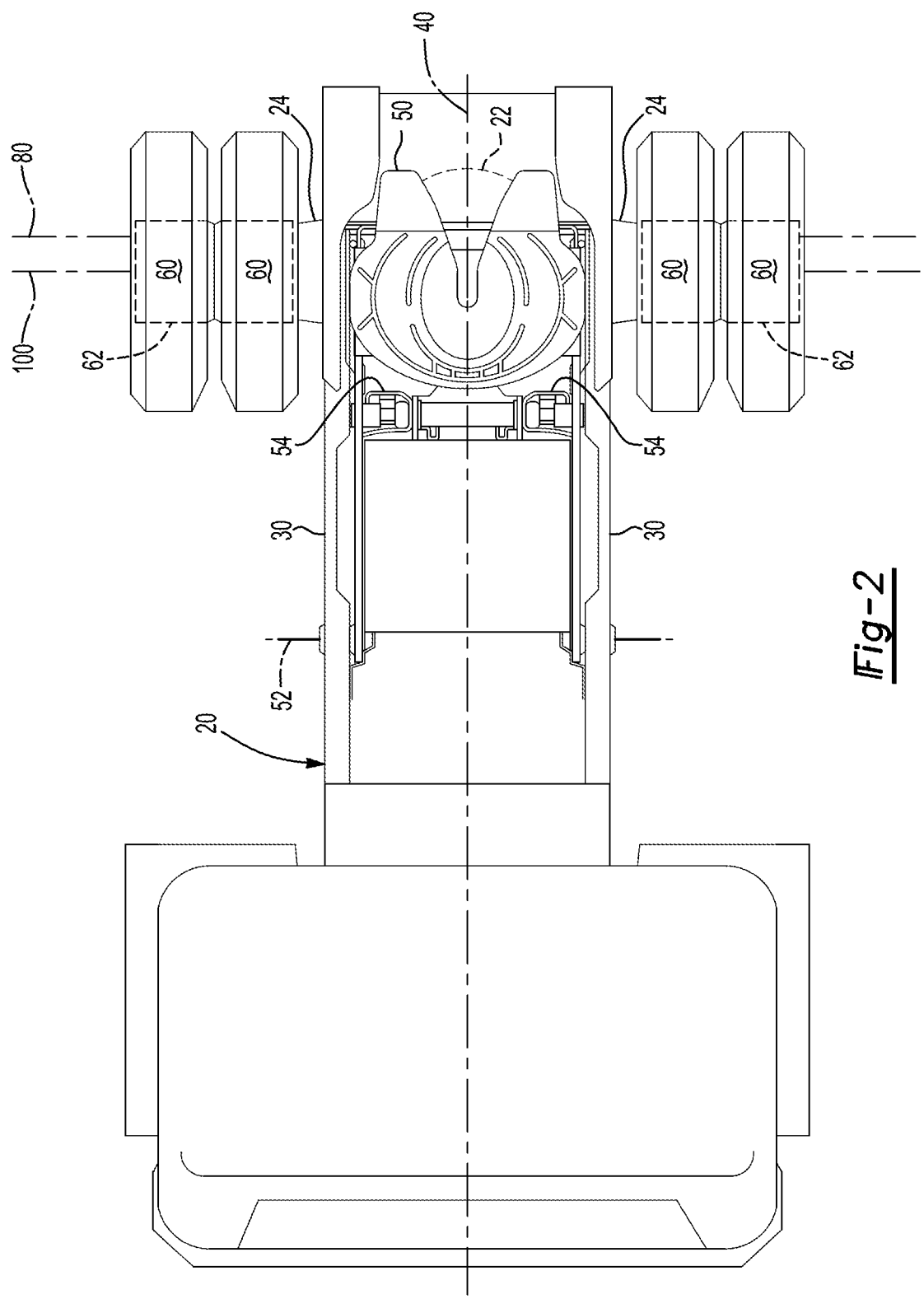
FIG. 2 is a top view of the vehicle shown in FIG. 1.

Referring to FIGS. 1 and 2, an example of a vehicle 10 is shown. The vehicle 10 may be of any suitable type. For instance, the vehicle 10 may be a tractor that may be configured to move a trailer for transporting cargo. The tractor may be a terminal tractor that may move a trailer at a warehouse facility, intermodal freight facility, or cargo yard. In at least one configuration and as is best shown with reference to FIGS. 3 and 4, the vehicle 10 may include a chassis 20, an axle assembly 22, at least one wheel end support housing 24, at least one wheel end assembly 26, and at least one linkage 28.

Figure 3:
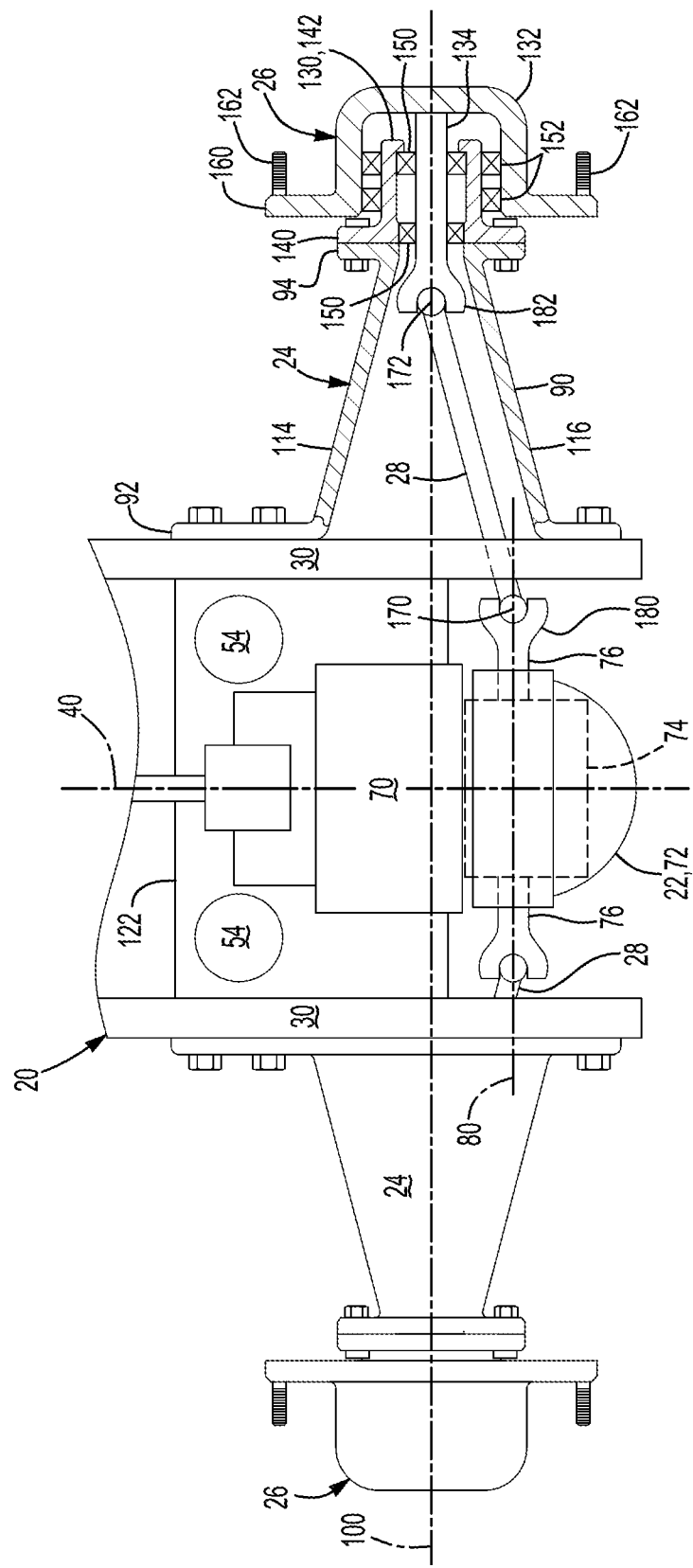
FIG. 3 is a fragmentary top view of a portion of the vehicle of FIG. 1 with various components omitted to better show an axle assembly, wheel end assemblies, and wheel end support housings.
Figure 4:
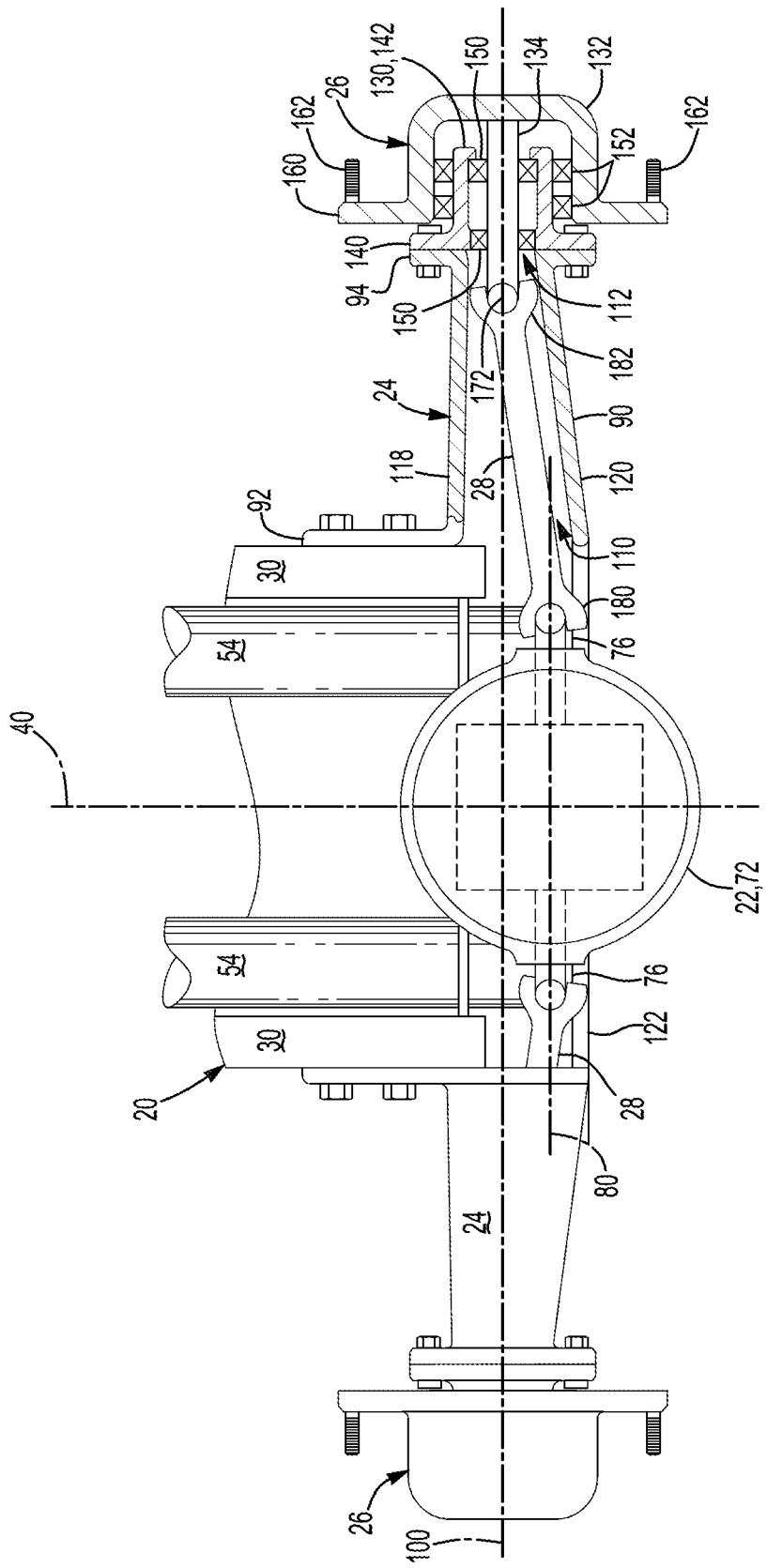
FIG. 4 is a fragmentary rear view of a portion of the vehicle shown in FIG. 3.

Referring to FIGS. 2-4, the chassis 20 may be the frame or support structure of the vehicle 10. In at least one configuration, the chassis 20 may include a pair of frame rails 30. The frame rails 30, 30 may be spaced apart from each other and may extend substantially parallel to each other. For instance, the frame rails 30, 30 may extend substantially parallel to a longitudinal axis or longitudinal center plane 40 of the vehicle 10. The longitudinal center plane 40 may be a vertical plane that may extend between the front of the vehicle 10 and the rear of the vehicle 10. The front of the vehicle 10 is to the left from the perspective shown in FIGS. 1 and 2 while the rear of the vehicle 10 is to the right from the perspective shown in these figures. The longitudinal center plane 40 may be disposed proximate the center of the vehicle 10 and may be spaced apart from and may be centered between the frame rails 30 in one or more configurations. The frame rails 30, 30 may be interconnected by one or more cross members that may extend in a lateral direction that may be horizontal and may be disposed substantially perpendicular to the longitudinal center plane 40.

Referring to FIGS. 1 and 2, a fifth wheel coupling 50 may be movably disposed on the chassis 20. The fifth wheel coupling 50 may allow a trailer to be pivotally coupled to the vehicle 10 in a manner known by those skilled in the art. The fifth wheel coupling 50 may be pivotable about a fifth wheel coupling axis 52 to raise and lower the fifth wheel coupling 50 with respect to the chassis 20. The fifth wheel coupling axis 52 may extend in a lateral direction and may be disposed substantially perpendicular to the longitudinal center plane 40. In FIG. 1, the fifth wheel coupling 50 is shown in the raised position with solid lines and is shown in the lowered position with phantom lines. The fifth wheel coupling 50 may be coupled to a trailer when in the raised position and may be detached from a trailer when in the lowered position.

Referring primarily to FIGS. 1-3, one or more lift cylinders 54 may be configured to pivot the fifth wheel coupling 50 about the fifth wheel coupling axis 52. The lift cylinders 54 may extend in a generally vertical direction and may be extended to raise the fifth wheel coupling 50 and retracted to lower the fifth wheel coupling 50. In the configuration shown, a pair of lift cylinders 54 are provided that are positioned between the frame rails 30 and are longitudinally positioned between the fifth wheel coupling axis 52 and the axle assembly 22. The lift cylinders 54 may be spaced apart from each other and may be disposed closer to an adjacent frame rail 30 than to the longitudinal center plane 40. As such, the gap or available package space between the frame rails 30, 30 may decrease due to the presence of the lift cylinders 54.

Referring primarily to FIGS. 2 and 3, the axle assembly 22 may provide torque to one or more traction wheel assemblies that may include a tire 60 mounted on a wheel 62. The axle assembly 22 may be mounted to the chassis 20. For example, the axle assembly 22 may be disposed between the frame rails 30, 30 and may extend along the longitudinal center plane 40 as is best shown in FIG. 3. In addition, at least a portion of the axle assembly 22 may be disposed between the lift cylinders 54, 54. The axle assembly 22 or a portion thereof may be positioned underneath the fifth wheel coupling 50 as is best shown in FIG. 2. One or more axle assemblies 22 may be provided with the vehicle 10. For instance, a tandem axle configuration may be provided in which axle assemblies are connected in series.

The axle assembly 22 may be of any suitable type and may receive power or torque from any suitable power source or power sources. For instance, the power source may be a non-electrical power source, such as an internal combustion engine, or an electrical power source, such as a battery, generator, or the like. In the configuration shown in FIG. 3, the axle assembly 22 may include an electric motor 70 when an electrical power source is provided. Regardless of the type of power source employed, the axle assembly 22 may include a housing assembly 72 and a differential assembly 74.

The housing assembly 72 may facilitate mounting of the axle assembly 22 to the chassis 20. In addition, the housing assembly 72 may receive various components of the axle assembly 22. For example, the housing assembly 72 or a differential carrier of the housing assembly 72 may receive and support the differential assembly 74.

The differential assembly 74 may be received in the housing assembly 72 and may be rotatable about a differential axis 80. The differential axis 80 may be stationary with respect to the chassis 20. The differential axis 80 may extend in a lateral direction and may be disposed parallel or substantially parallel to the fifth wheel coupling axis 52 in one or more configurations. The differential assembly 74 may transmit torque to the vehicle traction wheel assemblies and permit the traction wheel assemblies to rotate at different velocities. For example, the differential assembly 74 may include or may be operatively connected to a pair of output shafts 76 and may permit the output shafts 76 to rotate at different rotational speeds about the differential axis 80. The output shafts 76 may extend in opposite directions from the differential assembly 74 and may protrude through the housing assembly 72.

Referring to FIGS. 3 and 4, the wheel end support housing 24 may be mounted to the chassis 20. For instance, a wheel end support housing 24 may be mounted to a frame rail 30. In at least one configuration, the wheel end support housing 24 may be fixedly disposed on a side of a frame rail 30 that faces away from the axle assembly 22 and may extend away from the longitudinal center plane 40. As such, the wheel end support housing 24 may be stationary and may not move with respect to the chassis 20 and its frame rails 30, 30. In FIGS. 3 and 4, two wheel end support housings are shown such that a first wheel end support housing 24 is disposed on a first frame rail 30 and a second wheel end support housing 24 is disposed on a second frame rail 30. In at least one configuration, the first and second wheel end support housings 24 may have mirror symmetry with respect to the longitudinal center plane 40. The wheel end support housing 24 may be spaced apart from the axle assembly 22 and may not contact or engage the axle assembly 22. As is best shown in FIG. 4, the wheel end support housing 24 may extend below the chassis 20 and the frame rails 30, 30. In at least one configuration, the wheel end support housing 24 may be configured as a generally hollow structure that may include a tubular body 90, a first flange portion 92, and a second flange portion 94.

The tubular body 90 may be a generally hollow tubular structure that may extend around a wheel axis 100. The wheel axis 100 may extend in a lateral direction and may be disposed parallel or substantially parallel to the differential axis 80. The wheel axis 100 may be stationary with respect to the chassis 20. The tubular body 90 may define a first opening 110 and a second opening 112. In addition, the tubular body 90 may define a front wall 114, a rear wall 116, a top wall 118, and a bottom wall 120.

The first opening 110 may face toward the axle assembly 22. As is best shown in FIG. 4, at least a portion of the first opening 110 may extend below a frame rail 30. As such, the differential axis 80 and optionally the wheel axis 100 may extend through the first opening 110. In addition at least a portion of the first opening 110 may be disposed below the second opening 112. The linkage 28 may extend through the first opening 110.

The second opening 112 may be disposed at an opposite end of the tubular body 90 from the first opening 110. As such, the second opening 112 may face toward the wheel end assembly 26. The linkage 28 may not extend into the second opening 112.

Referring to FIG. 3, the front wall 114 may face toward the front of the vehicle 10 and may extend between opposing ends of the wheel end support housing 24. In at least one configuration, the front wall 114 may be disposed in a nonparallel relationship with the wheel axis 100. For instance, the front wall 114 may extend at an angle such that the front wall 114 becomes progressively closer to the wheel axis 100, the rear wall 116, or both, as the distance from the longitudinal center plane 40 increases.

The rear wall 116 may be disposed opposite the front wall 114. As such, the rear wall 116 may face toward the rear of the vehicle 10. The rear wall 116 may extend between opposing ends of the wheel end support housing 24. In at least one configuration, the rear wall 116 may be disposed in a nonparallel relationship with the wheel axis 100. For instance, the rear wall 116 may extend at an angle such that the rear wall 116 becomes progressively closer to the wheel axis 100 as the distance from the longitudinal center plane 40 increases.

Referring to FIG. 4, the top wall 118 may be disposed above the wheel axis 100 and may extend between opposing ends of the wheel end support housing 24. The top wall 118 may be disposed in a parallel or nonparallel relationship with the wheel axis 100. For instance, the top wall 118 may extend at an angle such that the top wall 118 becomes progressively closer to the wheel axis 100, the bottom wall 120, or both, as the distance from the longitudinal center plane 40 increases.

The bottom wall 120 may be disposed opposite the top wall 118. The bottom wall 120 may be disposed below the wheel axis 100 and may extend between opposing ends of the wheel end support housing 24. The bottom wall 120 may be disposed in a parallel or nonparallel relationship with the wheel axis 100. For instance, the bottom wall 120 may extend at an angle such that the bottom wall 120 becomes progressively closer to the wheel axis 100 as the distance from the longitudinal center plane 40 increases.

The first flange portion 92 may facilitate mounting of the wheel end support housing 24 to a portion of the chassis 20. The first flange portion 92 may be disposed proximate an end of the tubular body 90 that may face toward a frame rail 30. In at least one configuration, the first flange portion 92 may extend away from the wheel axis 100 and may be mounted to a frame rail 30. The first flange portion 92 may be attached to the frame rail 30 in any suitable manner, such as with one or more fasteners like bolts.

The second flange portion 94 may facilitate mounting of the wheel end assembly 26 to the wheel end support housing 24. The second flange portion 94 may be disposed proximate an end of the tubular body 90 that may face away from a frame rail 30. In at least one configuration, the second flange portion 94 may extend away from the wheel axis 100. It is also contemplated that the second flange portion 94 may be omitted.

Referring primarily to FIG. 4, a skid plate 122 may optionally be provided that may extend between the wheel end support housings 24. For instance, the skid plate 122 may be disposed proximate the bottom wall 120 of each wheel end support housing 24 and may extend from one wheel end support housing 24 to the other wheel end support housing 24. As such, the skid plate 122 may be disposed below and may be spaced apart from the chassis 20 and its frame rails 30. In at least one configuration, one or more lift cylinders 54 for the fifth wheel coupling 50 may be supported by or may be mounted to the skid plate 122. The skid plate 122 may also extend underneath a portion of the axle assembly 22 and may optionally help support the axle assembly 22.

Referring to FIGS. 3 and 4, the wheel end assembly 26 may be configured to support a wheel 62. The wheel end assembly 26 may be mounted to the wheel end support housing 24 at an end that may be disposed opposite the frame rail 30. For instance, a wheel end assembly 26 may be mounted to the second flange portion 94 of the wheel end support housing 24 with one or more fasteners like bolts. As such, the wheel end assembly 26 may be spaced apart from the chassis 20 and the axle assembly 22. In the configuration shown, the wheel end assembly 26 is depicted with a non-steerable configuration; however, it is contemplated that the wheel end assembly 26 may be provided in a steerable configuration in other embodiments. A simplified example of the wheel end assembly is shown in FIGS. 3 and 4. In such a configuration, the wheel end assembly may include a spindle 130, a hub 132, and an input shaft 134.

The spindle 130 may extend along or around a wheel axis 100 and may be configured to support components of the wheel end assembly 26. The spindle 130 may be fixedly mounted to the wheel end support housing 24. As such, the spindle 130 may be fixedly positioned with respect to the wheel axis 100, the wheel end support housing 24, the chassis 20, or combinations thereof. In at least one configuration, the spindle 130 may include a mounting flange 140 and a tubular portion 142.

The mounting flange 140 may facilitate mounting of the spindle 130 to the wheel end support housing 24. The mounting flange 140 may be disposed proximate an end of the spindle 130 that may face toward the wheel end support housing 24. The mounting flange 140 may extend away from the wheel axis 100 and may facilitate mounting of the spindle 130. For instance, the mounting flange 140 may be mounted to the second flange portion 94 of the wheel end support housing 24. The spindle 130 may be attached to the wheel end support housing 24 in any suitable manner, such as with one or more fasteners like bolts that may extend into aligned holes in the second flange portion 94 and the mounting flange 140. It is also contemplated that the spindle 130 may be integrally formed with the wheel end support housing 24 rather than being a separate part from the wheel end support housing 24, in which case the second flange portion 94 and the mounting flange 140 may be omitted.

The tubular portion 142 may extend from the mounting flange 140. For instance, the tubular portion 142 may extend in an axial direction that may extend away from the mounting flange 140 in a lateral direction that extends away from the axle assembly 22. The tubular portion 142 may be configured as a hollow tubular structure that may at least partially define a hole that may extend through the spindle 130. The hole that may receive one or more bearing assemblies 150 that may rotatably support the input shaft 134. In addition, the tubular portion 142 may be received inside and may support one or more wheel bearing assemblies 152 that may rotatably support the hub 132.

The hub 132, which may also be referred to as a wheel hub, may be configured to facilitate mounting of at least one wheel 62. The hub 132 may be rotatable about the wheel axis 100 with respect to the spindle 130, the wheel end support housing 24, and the chassis 20. In a drive axle configuration, the hub 132 may be operatively connected to the input shaft 134. For instance, the input shaft 134 may be directly or indirectly coupled to the hub 132. A gear reduction unit, such as a planetary gear set or a bevel gear set that may reduce the torque transmitted between the input shaft 134 and the hub 132 may be provided between and may operatively connect the hub 132 to the input shaft 134. In at least one configuration, the hub 132 may include a hub mounting flange 160.

The hub mounting flange 160 may facilitate mounting of at least one wheel 62. For example, the hub mounting flange 160 may extend away from the wheel axis 100 and may include holes that may each receive a mounting lug bolt 162. A mounting lug bolt 162 may extend through a corresponding hole in a wheel 62. A lug nut may be threaded onto a mounting lug bolt to secure the wheel 62 to the hub 132. In the configuration shown in FIG. 2, a configuration is shown in which two tires 60 are rotatably supported by each hub 132; however it is contemplated that a single tire 60 and wheel 62 may be provided.

A suspension system that may facilitate upward and downward movement of the wheel end assembly 26 with respect to the chassis 20 may not be provided with the vehicle 10. As such, the wheel axis 100 may be stationary with respect to the chassis 20 and the wheel end support housing 24. The wheel axis 100 may be disposed parallel or substantially parallel to the differential axis 80. The wheel axis 100 may differ from the differential axis 80. For instance, the wheel axis 100 may be offset from the differential axis 80 in one or more directions, such as a longitudinal direction and/or a vertical direction.

A longitudinal direction may extend along a longitudinal axis or the longitudinal center plane 40, which is a horizontal direction from the perspective shown in FIGS. 1 and 2 and extends up and down from the perspective shown in the top view of FIG. 3. As is best shown in FIGS. 1 and 3, the wheel axis 100 may be longitudinally positioned between the fifth wheel coupling axis and the differential axis 80. In at least one configuration, the wheel axis 100 may be longitudinally positioned between the lift cylinders 54, 54 and the differential axis 80. Thus, the differential axis 80 may be longitudinally positioned closer to the rear of the vehicle 10 than the wheel axis 100.

A vertical direction may extend along a vertical axis that may be disposed perpendicular to the longitudinal axis, which extends up and down from the perspective shown in FIGS. 1 and 4. The wheel axis 100 may be disposed below the fifth wheel coupling axis 52, above the differential axis 80, or both. It is also contemplated that the wheel axis 100 may not be vertically offset from the wheel axis 100 in one or more configurations.

Referring to FIGS. 3 and 4, a linkage 28 may operatively connect the differential assembly 74 to the hub 132. For instance, the linkage 28 may operatively connect an output shaft 76 to the input shaft 134 of a wheel end assembly 26. The linkage 28 may be of any suitable type and may have a fixed length or variable length. For instance, the linkage 28 may be a shaft, such as half shaft or a Cardan shaft that may have a universal joint at an end, thereby enabling the linkage 28 to rotate freely when the linkage 28 is disposed at an oblique angle or in a nonparallel relationship with respect to the output shaft 76, the input shaft 134, or both. The linkage 28 may be generally linear and may have a first end 170 and a second end 172.

The first end 170 may be connected to an output shaft 76 with a first universal joint 180. The first end 170, the first universal joint 180, or both may be disposed outside of the wheel end support housing 24 and may be disposed below the chassis 20. Optionally, the first end 170, the first universal joint 180, or both may be positioned closer to the longitudinal center plane 40 than the frame rails 30 are positioned to the longitudinal center plane 40.

The second end 172 may be disposed opposite the first end 170 and may be connected to the input shaft 134 with a second universal joint 182. The second end 172, the second universal joint 182, or both may be received inside the wheel end support housing 24. As such, the second end 172 may be laterally positioned further from the longitudinal center plane 40 than the frame rails 30 are positioned from the longitudinal center plane 40.

A vehicle having a configuration as described above may allow an axle assembly to be mounted to a chassis such that the differential axis may be offset in one or more directions from the wheel axis. This may allow an axle assembly to be positioned further rearward in the vehicle without changing the position of the wheels, wheel axis, fifth wheel coupling, lift cylinders, or combinations thereof, thereby providing a drivetrain that may be adaptable to various vehicle configurations. Such a configuration may also provide additional package space in front of the axle assembly that may be used to package other components, such as batteries for powering an axle assembly having an electric motor. The present invention may also allow the lift cylinders to be mounted to the skid plate that may extend between the wheel end support housings, thereby eliminating other cross members or supporting components that may extend between the frame rails to serve this purpose. The present invention may also provide wheel end support housings that may be separate from the axle assembly, which may allow the axle assembly to be mounted separately from the wheel end assemblies and may provide design flexibility in that the wheel end assemblies and axle assembly may be designed and mounted independently from each other.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a chassis that includes first and second frame rails;
   an axle assembly that is mounted to the chassis and that includes a differential assembly that is rotatable about a differential axis;
   a wheel end support housing that is mounted to the first frame rail and is spaced apart from the axle assembly;
   a wheel end assembly that is mounted to the wheel end support housing, wherein the wheel end assembly has a hub that is rotatable about a wheel axis that differs from the differential axis; and
   a linkage that is received in the wheel end support housing and that operatively connects the differential assembly to the hub.

2. The vehicle of claim 1 wherein the axle assembly is disposed between the first and second frame rails.

3. The vehicle of claim 1 wherein the wheel end support housing is fixedly disposed on a side of the first frame rail that faces away from the axle assembly.

4. The vehicle of claim 1 wherein the wheel end assembly is spaced apart from the axle assembly and the chassis and is mounted to an end of the wheel end support housing that is disposed opposite the first frame rail.

5. The vehicle of claim 1 wherein the wheel axis and the differential axis are stationary with respect to the chassis.

6. The vehicle of claim 1 wherein the wheel axis is disposed above the differential axis.

7. The vehicle of claim 1 wherein a fifth wheel coupling is moveably disposed on the chassis and the axle assembly is positioned underneath the fifth wheel coupling.

8. The vehicle of claim 7 wherein the fifth wheel coupling is pivotable about a fifth wheel coupling axis and the wheel axis is longitudinally positioned between the fifth wheel coupling axis and the differential axis.

9. The vehicle of claim 7 further comprising first and second lift cylinders that are configured to raise and lower the fifth wheel coupling, wherein the axle assembly is disposed between the first and second lift cylinders.

10. The vehicle of claim 9 wherein the wheel axis is longitudinally positioned between the differential axis and the first and second lift cylinders.

11. The vehicle of claim 7 further comprising a second wheel end support housing that is mounted to the second frame rail and is spaced apart from the axle assembly, and a skid plate that extends from the wheel end support housing to the second wheel end support housing.

12. The vehicle of claim 11 wherein the skid plate is disposed below and is spaced apart from the chassis.

13. The vehicle of claim 11 wherein first and second lift cylinders that are configured to raise and lower the fifth wheel coupling are mounted to the skid plate.

14. A vehicle comprising:
   a chassis that includes first and second frame rails;
   an axle assembly that is mounted to the chassis and that includes a differential assembly that is rotatable about a differential axis;
   a wheel end support housing that is mounted to the first frame rail and is spaced apart from the axle assembly;
   a wheel end assembly that is mounted to the wheel end support housing, wherein the wheel end assembly has a hub that is rotatable about a wheel axis, wherein the differential axis is disposed below the wheel axis and the differential axis is longitudinally positioned closer to a rear of the vehicle than the wheel axis; and
   a linkage that is received in the wheel end support housing and that operatively connects the differential assembly to the hub.

15. The vehicle of claim 14 wherein the wheel end support housing extends below the chassis and has a first opening that faces toward the axle assembly and a second opening that faces toward the wheel end assembly.

16. The vehicle of claim 15 wherein the linkage extends through the first opening but does not extend into the second opening.

17. The vehicle of claim 15 wherein the first opening is disposed below the second opening.

18. The vehicle of claim 14 wherein a first universal joint couples an output shaft of the differential assembly to a first end of the linkage.

19. The vehicle of claim 18 wherein a second universal joint couples a second end of the linkage that is disposed opposite the first end to the wheel end assembly.

20. The vehicle of claim 19 wherein the first universal joint is disposed outside of the wheel end support housing and the second universal joint is received inside the wheel end support housing.

* * * * *